United States Patent

[11] 3,542,439

| [72] | Inventor | Henry A. Joos<br>Mount Clemens, Michigan |
| --- | --- | --- |
| [21] | Appl. No. | 811,285 |
| [22] | Filed | March 28, 1969 |
| [45] | Patented | Nov. 24, 1970 |
| [73] | Assignee | LTV Aerospace Corporation<br>Dallas, Texas<br>a corporation of Delaware |

[54] APPARATUS FOR PREVENTING DAMAGE TO PAVED SURFACES BY CLEATED, VEHICULAR DRIVING MEMBERS
18 Claims, 9 Drawing Figs.

[52] U.S. Cl............................................................ 305/34,
305/46, 305/51
[51] Int. Cl........................................................ B62d 55/26

[50] Field of Search............................................ 305/34, 35, 46

[56] References Cited
UNITED STATES PATENTS

| 2,254,787 | 9/1941 | Aukland........................ | 305/34 |
| --- | --- | --- | --- |
| 2,359,586 | 10/1944 | Sayler........................... | 305/34 |
| 2,409,502 | 10/1946 | Leguillon...................... | 305/35 |
| 3,475,060 | 10/1969 | Kaifesh........................ | 305/46X |

*Primary Examiner*—Richard J. Johnson
*Attorneys*—H. C. Goldwire and C. W. McHugh

ABSTRACT: An apparatus having a pad is adapted for mounting on the cleated track shoe or driving wheel of a vehicle. The apparatus is convertible between a pad-exposed mode for operation over paved surfaces and a grouser-exposed mode for operation in undeveloped terrain.

Patented Nov. 24, 1970

HENRY A. JOOS
INVENTOR
BY *HC Goldwire*
ATTORNEY

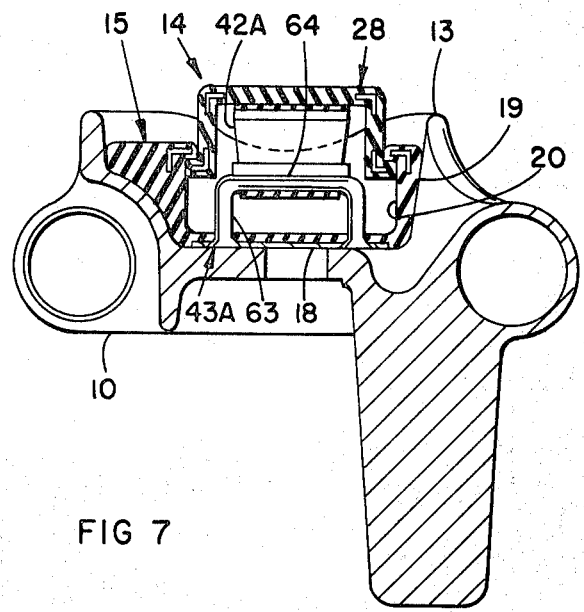
FIG 7
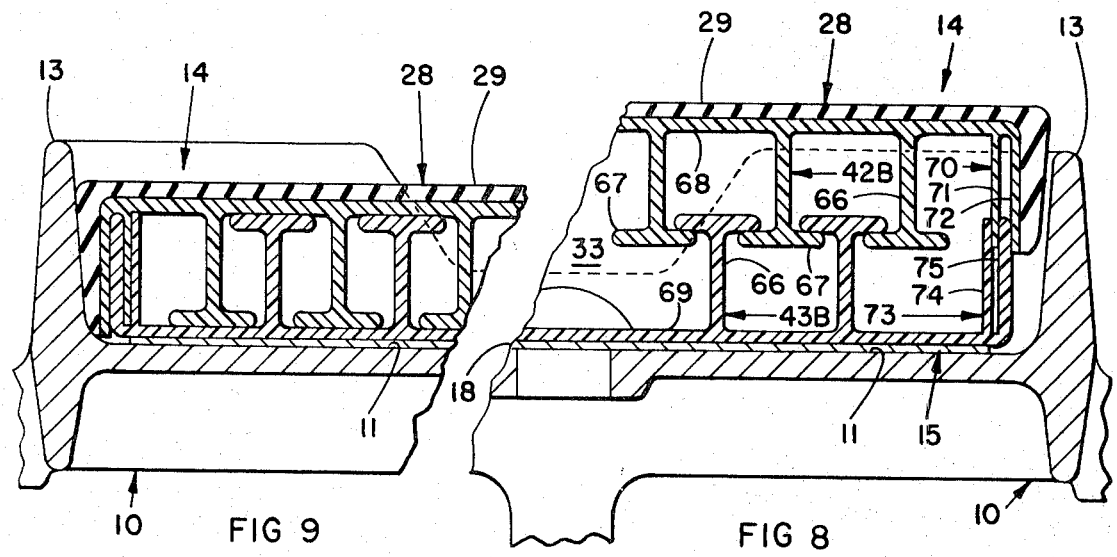
FIG 9
FIG 8

APPARATUS FOR PREVENTING DAMAGE TO PAVED SURFACES BY CLEATED, VEHICULAR DRIVING MEMBERS

This invention relates to vehicles having cleated traction members and, more particularly, to an apparatus for selectively permitting and preventing contact between the cleats and ground beneath the vehicle.

Vehicles adapted for operation over unpaved surfaces are advantageously equipped with driving wheels or tracks which have rigid grousers or cleats for improved traction. Examples of such vehicles include tracked vehicles, such as tanks and track-laying tractors, as well as tractors having circular driving wheels. The rigid cleats or grousers employed by such vehicles provide greatly improved traction in moist earth or sandy terrain, but, as is known in the art, they are not suited for use on hard-surfaced roads in that they may easily damage the roads and do not provide satisfactory traction for the vehicles. In order to permit the operation of such vehicles on hard-surfaced roads, pads of a resilient material are often mounted on the driving members (e.g., driving wheels or tracks) of the vehicles by bolts or other fasteners such that the pads, rather than the grousers, contact the roads and support the vehicles. The use of such pads provides good traction on hard-surfaced roads, protects the road surfaces from the grousers, and protects the vehicles from excessive wear by helping to absorb mechanical shock. Unfortunately, however, such resilient pads do not provide satisfactory traction in the field for the vehicles and must be unbolted or otherwise removed from the driving members to expose the grousers when efficient traction in the field is desired. This mounting and unmounting of the resilient pads is tedious and time-consuming and becomes a serious problem when it is necessary to operate a vehicle of the above-described type alternately over hard-surfaced roads and undeveloped land. Furthermore, even occasional mounting and removing of such pads is undesirable in that the vehicles are inoperative and workmen are not productively employed while the pads are being mounted or removed. Even more serious problems arise in military operation of such vehicles; for example, it may be critical that a tank be able to travel at high speeds over both hard-surfaced roads and in various types of undeveloped terrain. It is obviously impractical, under battle conditions, to require that the tank be temporarily inoperative while military personnel remove or attach resilient pads to the track shoes of the tank and thus expose themselves to enemy fire.

Present resilient pads are either solid or hollow structures, the latter being generally supported by air under pressure within the hollow structure. Pneumatically supported pads, as compared with the solid pads, have the advantages of being able to yield more readily to projections or objects on a road surface and to provide better shock-absorbing characteristics. Pneumatic pads have the disadvantages, when under extreme stress, of being susceptible to blowouts, punctures, and severe lateral deformation.

With respect to vehicles, such as farm tractors, which have circular driving wheels rather than tracks, it is known that when the driving wheels of such vehicles are provided with cleats which project radially outwardly from the driving wheels, the vehicles have improved traction in soft earth as compared with vehicles equipped with rubber tires. Such cleated wheels are not in general use, however, because of the damage which the cleats may cause to hard-surfaced roads; in fact, their use on hard-surfaced roads is illegal in many areas of the nation.

It is, accordingly, a major object of the present invention to provide an improved pad apparatus for use in combination with a vehicle driving member of the type used in supporting connection with a vehicle and having a grouser for improved traction.

Another object is to provide such a pad apparatus which is quickly convertible between a pad-exposed mode for efficient operation of the vehicle over hard-surfaced roads and a grouser-exposed mode for efficient cross-country operation.

A further object is to provide such a pad apparatus which may be quickly converted between the two operational modes by an operator within the vehicle.

Yet another object is to provide such a pad assembly in which the pad is pneumatically supported to cushion the vehicle from road irregularities.

A still further object is to provide a pneumatically supported pad apparatus which is reinforced to resist undesired deformation and failure under stress.

Other objects and advantages will be apparent from the specification and claims and from the accompanying drawing illustrative of the invention.

In the drawing:

FIG. 2 is a cross-sectional view of a portion of the pad assembly and track shoe taken on the line II, III—II, III of FIG. 1;

FIG. 3 is a cross-sectional view, similar to FIG. 2, of the remaining portion of the pad assembly and track shoe taken on the line II, III—II, III of FIG. 1 but with the second structure of the pad assembly in a retracted position.

FIG. 7 is a cross-sectional view of the second embodiment of the pad assembly taken on the line VII—VII of FIG. 5;

FIG. 8 is a cross-sectional view, similar to FIGS. 2 and 5, of a portion of a third embodiment of the pad assembly mounted on the track shoe; and FIG. 9 is a cross-sectional view, similar to FIGS. 3 and 6, of the remaining portion of the third embodiment of the pad assembly of FIG. 8 mounted on the track shoe.

Figure 1:
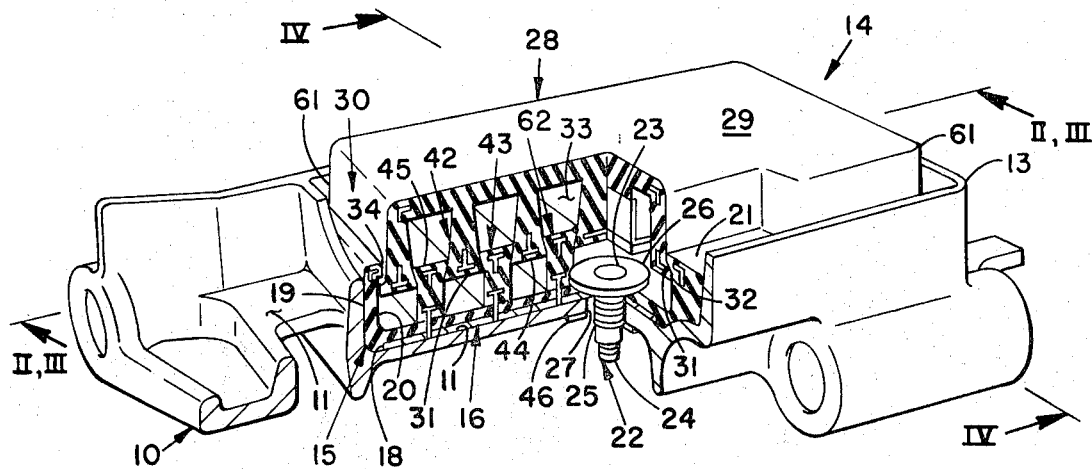
FIG. 1 is a perspective, partially cutaway view of a preferred embodiment of the pad assembly mounted on a track shoe of a tracked vehicle.

With initial reference to FIG. 1, a track shoe 10 of the widely used type which forms the continuous tracks of track-laying vehicles has a first face 11 and, with additional reference to FIG. 2, an opposed, second face 12. A grouser 13 is rigidly mounted on the first face 11 and, as shown, may be an integral part of the track shoe 10. As is known in the art, when the track shoe 10 is in a position beneath a tracked vehicle (not shown) and is supportingly disposed between the vehicle and the ground, the grouser 13 extends outwardly from the first face 11 and into contact with the ground for improving the traction of the vehicle in cross-country operation. An elongated guide member 76 (FIG. 2) projects from the second face downwardly, as viewed, for guiding the track shoe along its course as it moves past the driving wheels of the tracked vehicle (not shown).

A pad apparatus 14 comprises a concave first structure 15 rigidly mounted (as will be described) on the track shoe first face 11 and suitably having a generally flat base structure 16 which seats against and extends parallel to the track shoe first face 11. The grouser 13 of the particular track shoe 10 shown in the drawing defines a closed, generally rectangular figure such that the portion of the track shoe first face 11 disposed within the closed figure so defined is also of generally rectangular configuration. Preferably, the base structure 16 is of a rectangular configuration, in plan view, such that it extends within the closed figure defined by the grouser 13 and substantially covers the portion of the shoe first face 11 enclosed by the grouser. With particular reference to FIG. 2, the base structure 16 suitably comprises a rubber layer 17 and a layer or base plate 18 of a more rigid material, e.g., of steel, molded into and below the rubber layer 17. The rubber layer 17, as well as other structures which will be hereinafter described, are suitably of vulcanized rubber having approximately the rigidity of rubber commonly employed in automobile tires. Unless otherwise indicated, the remaining portions of the pad apparatus 14 are of rubber. The layers 17, 18 extend parallel to the shoe first face 11 and are disposed substantially in vertical register with each other. The metal base plate 18 is configured such that it seats against the shoe first face 11 and it is immovably located with respect to the shoe first face, as will be described.

A continuous sidewall 19 is connected to the base structure 16, as by being molded integrally with or bonded to the rubber layer 17, and projects outwardly from the base structure 16 and the shoe first face 11. The sidewall 19 is located adjacent at least a portion of the grouser 13 and, in the preferred embodiment, extends peripherally of the base structure 16 and parallel to and in contact with the grouser. The sidewall 19 is provided with a first continuous surface 20 disposed generally perpendicular to the shoe first face 11, facing inwardly from the grouser 13, defining a closed, generally rectangular figure, and having outward extension from the shoe first face 11. The sidewall 19 has a distal edge 21 spaced outwardly from the shoe first face 11 but disposed between the shoe first face and the outermost (uppermost, as shown in the drawing) portion of the grouser 13.

With particular reference to FIG. 1, the first structure 15 is rigidly mounted on the shoe first face 11 by means such as a generally cylindrical valve member 22 as will be described and, optionally, a suitable adhesive applied between the base plate 18 and the shoe first face 11. The valve member 22 has upper and lower ends 23, 24 and a cylindrical, metal, externally threaded portion 25 adjacent the upper end 23, and it is suitably of the type used in automobile tires, such that it has an inlet through its lower end 24, an outlet through its upper end 23, and an internal one-way valve mechanism having communication with the inlet and outlet. A substantially flat, circular flange 26 is formed on the valve member upper end 23 coaxial with the threaded portion 25. A bore 27 of a diameter slightly larger than that of the threaded portion 25 of the valve member 22 is formed perpendicularly to the shoe first face 11 and through the base structure 16 and the track shoe 10, the bore being spaced centrally from the first continuous surface 20 of the sidewall 19 by a distance greater than the radial extension of the flange 26 from the member threaded portion 25 so that the flange seats upon the base structure 16 when the valve member is thus mounted in place. When the flange 26 is thus seated upon the base structure rubber layer 17, the bore threaded portion 25 extends downwardly for a distance past the track shoe second face 12 to permit threaded engagement of a suitable nut 46 to the threaded portion; and, upon the nut being threaded upwardly upon the threaded portion 25 and against the shoe second face 12, the valve member 22 is urged downwardly against the base structure 16 to firmly lock the first structure 15 in place.

Figure 4:
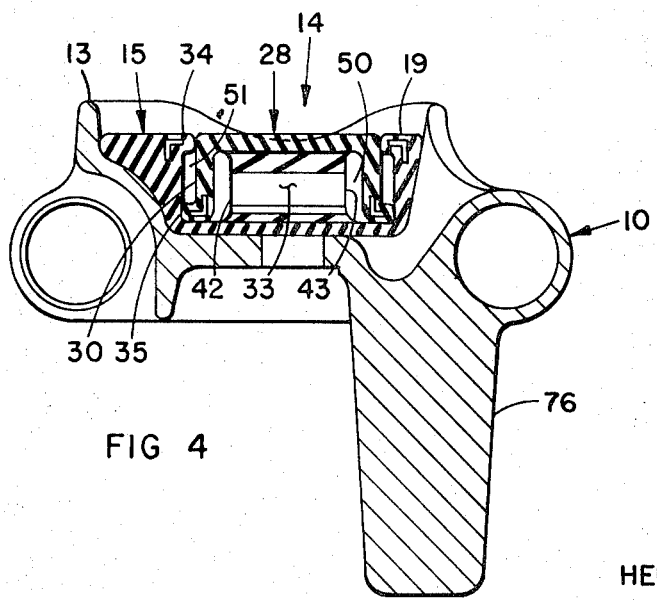
FIG. 4 is a cross-sectional view of the pad assembly and track shoe taken on the line IV—IV of FIG. 3.

A concave second structure 28 is telescopically mounted within the first structure sidewall 19 and is provided with a continuous, outermost (uppermost, as shown in the drawing) portion 29. "Outer" and "inner" are used hereinafter with reference to the shoe first face 11, the outermost portion 29 of the second structure 28 being the portion of the second structure most remote from the shoe first face, or the uppermost portion as shown in the drawing. The outermost portion 29 comprises a flat sheet or layer of a resilient material such as vulcanized rubber, is disposed in vertical register with the base structure 16, and extends generally parallel to the shoe first face 11. The second structure 28 has a sidewall 30 integrally formed with the outermost portion 29, projecting inwardly from the periphery of the outermost portion, an configured such that it mates telescopically within the first structure sidewall 30; it is thus of generally rectangular configuration, in plan view when looking downwardly upon the second structure 28 and the shoe first face 11. The second structure sidewall 30 has a distal edge 31 confronting the track shoe first face 11 and is provided with a second continuous surface 32 (forming the distal surface of a lip 35 projecting from the second structure sidewall 30, as will be more fully described) which is approximately perpendicular to the shoe first face 11 and defines a closed, generally rectangular figure. The second continuous surface 32 faces toward the first continuous surface 20 and is sealingly and slideably associated, along its entire length, with that continuous surface 20; thus, the second structure 28 cooperates with the first structure 15 to form a closed, variable-volume chamber 33 and is vertically slideable between an extended position, as shown in FIGS. 1 and 2, in which it projects outwardly relative to the shoe first face 11 (upwardly as shown in FIGS. 1 and 2) to a location beyond the outermost portion of the grouser 13 and a retracted position (as shown in FIGS. 3 and 4) in which it is displaced inwardly from the extended position. In the preferred embodiment, the outermost portion 29 of the second structure 28 is disposed between the outermost portion of the grouser 13 and the shoe first face 11 when the second structure 15 is in its retracted position, and the distal edge 31 of the second structure sidewall 30 seats against the base structure 16.

With particular reference to FIG. 3, the second structure 28 is restrained from moving outwardly beyond its extended position by means including, in the preferred embodiment, a first lip 34 formed on the first continuous surface 20, projecting from that surface toward the second structure sidewall 30, and extending along the first structure sidewall 19 adjacent its distal edge 21. The first lip 34 preferably is formed integrally with the first structure sidewall 19 and it is spaced upwardly from the base structure 16 by a distance sufficient to permit movement of the second structure 28 between its first and second positions, as will be more fully explained. A second lip 35 is similarly formed on the second structure sidewall 30 adjacent the distal edge 31 of the second structure sidewall 30 and projects from that sidewall toward and into sliding contact with the first structure sidewall 19. In the embodiment shown in FIGS. 1—4, the second continuous surface 32 comprises the distal surface of the second lip 35, which surface confronts and is in sliding and sealing contact with the first continuous surface 20. When the second structure 28 is in its retracted position, the second lip 35 is spaced from the first lip 34 by the distance which the second structure moves in sliding between its extended and retracted positions. The second lip 35 seats lockingly against the first lip 34, upon the second structure 28 being in its extended position.

If the first and second lips 34, 35 are formed of a resilient material, as in the present embodiment wherein they are formed of rubber and integrally with the respective rubber sidewalls 19, 30 from which they project, it is important that they be reinforced by means of reinforcing strips of a material more rigid than the lip material, each strip being embedded at least partially within one of the lips 34, 35. With respect to the first lip 34, and as shown in FIG. 3, a first reinforcing strip 36, suitably of polyethylene, is embedded partially within the lip 34 and partially within the associated first structure sidewall 19 and extends generally parallel to the major axis of the lip. The first reinforcing strip 36, in cross section, comprises first and second, substantially perpendicular portions 37, 38 and is suitably generally L-shaped, as shown, with the juncture of the portions 37, 38 being disposed within the sidewall 19 and in line horizontally with the approximate center of the first lip 34. The first strip portion 37 is disposed entirely within the first sidewall 19 and, in cross section, projects within that sidewall and downwardly from the second strip portion 37, i.e., perpendicularly to, and toward the shoe first face 11. The second strip portion 38 projects horizontally from the first strip portion 37, toward the second structure sidewall 30, and within the first lip 34. With respect to the second lip 35, a second reinforcing strip 39 is similarly embedded partially therein and also has, in cross section, first and second, substantially perpendicular portions 40, 41, the first portion 40 projecting upwardly from the approximate center of the second portion 41 and being disposed entirely within the second structure sidewall 30; the second portion 41 projects horizontally within the second structure sidewall 30 and to a locus within the second lip 35 in vertical register with the second (horizontal) portion 38 of the first reinforcing strip 36.

In some applications, the above-described first and second lips 34, 35 are sufficient to effectively restrain the second structure 28 from moving outwardly beyond its extended position, as will be explained hereinafter. In the preferred embodiment, however, additional restraining means are provided, as will now be described. Referring to FIG. 2, at least one, and preferably a plurality of elongated, first restraining members 42 is provided, each being connected to the second structure outermost portion 29 (as by being formed integrally therewith) and projecting therefrom inwardly toward the shoe first face 11. The first restraining members 42 are mutually spaced and disposed in parallel alinement. In cross section, each first restraining member 42 has a widened distal portion 44 adjacent its lowermost edge and of an approximately wedge-shaped configuration which tapers in the direction toward the outermost portion 29 of the second structure 28. At least one, and preferably a plurality of elongated, second restraining members 43 is provided, each being connected to (as will be described) and projecting outwardly from the base structure 16. Each second restraining member 43 has a widened distal portion 45 similar to the widened distal portions 44 of the first restraining members 42 and disposed between the outermost portion 29 of the second structure 28 and the distal portions 44 of the first restraining members 42 in all positions of the second structure 28. The second restraining members 43 project transversely of their respective longitudinal axes and outwardly from the base structure 16 and from the shoe first face 11 and they are disposed in sliding and interdigitating relation with the first restraining members 42. The widened distal portions 44, 45 of the first and second restraining members 42, 43 are similarly configured such that they seat against each other upon the second structure 28 being in its extended position, the first restraining members 42 each being in vertical register with the respective, adjacent, second restraining members 43 at the widened distal portion 44, 45 of the first and second restraining members 42, 43. In other words, upon the second structure being in its extended position, the first and second restraining members 42, 43 interlock with each other in dovetail fashion. Each of the second restraining members 43 has, parallel to its longitudinal axis, substantially flat, parallel, opposite side surfaces 47 extending outwardly with respect to the shoe first face 11 and from the base structure 16 to the widened distal portion 45 of the respective second restraining member 43. Each of the corresponding plurality of first restraining members 42, however, has opposite side surfaces 48 which diverge outwardly in the downward direction toward the respective restraining member distal portion 44 and, at its widest position, each first restraining member 42 is slideably associated with at least one of the flat side surfaces 47 of the adjacent second restraining members 43 on either side of the respective first restraining members 42.

If, as in the present, preferred embodiment, the widened distal portions 44, 45 of the first and second restraining members 42, 43 are of a resilient material such as rubber, they are reinforced by means of third and fourth reinforcing strips 49, 50, respectively, of a more rigid material such as polyethylene. Each first restraining member 42 has a third reinforcing strip 49 bondingly embedded within its widened distal portion 44 and extending parallel to its longitudinal axis. In cross section, each third reinforcing strip 49 is of a T-shaped configuration similar to that of the second reinforcing strips 39 (FIG. 3) and comprises a horizontal portion 51 which projects horizontally within the respective widened distal portion 44 of the respective first restraining member 42 and a vertical portion 52 which projects vertically from the center of the horizontal portion 51, within the respective first restraining member 42, and toward the outermost layer 29. The fourth reinforcing strips 50, in cross section, are also T-shaped, having horizontal and vertical portions 53, 54, and they are embedded similarly within the widened distal portions 45 of the respective second restraining members 43 but with the vertical portions 54 each projecting from the respective horizontal portions 53 downwardly toward the base structure 16. These third and fourth reinforcing strips 49, 50 are disposed such that, upon the second structure 28 being in its extended position, the horizontal portions 51 of the third reinforcing strips 49 are spaced between the like horizontal portions 53 of the fourth reinforcing strips 50 and the base structure 16; the horizontal portions 51 of the third reinforcing strips 49 extend, in cross section, such that their distal edges are in vertical register with the horizontal portions 52 of the respective, immediately adjacent fourth reinforcing strips 54. Each of the vertical portions 52, 54 of the third and fourth reinforcing strips 49, 50 projects, from the respective, associated horizontal strip portion 51, 53, past the adjacent, opposite, horizontal strip portions 53, 51; e.g., each vertical strip portion 52 of the third reinforcing strips 49 projects upwardly past the horizontal strip portions 53 of the adjacent fourth reinforcing strips 50 and to a point between the second concave structure 28 and the adjacent horizontal strip portions 53.

The second restraining members 43 may be connected to the base structure 16 as by being integrally formed with the rubber layer 17 of the base structure 16; or, in the preferred embodiment, they are bonded to the rubber layer 17 and further restrained by T-shaped, fifth reinforcing strips 55 similar to those previously described. Each of these fifth reinforcing strips 55 is embedded in the lower portion of a respective one of the second restraining members 43, with the horizontal portion 56 of each fifth reinforcing strip being spaced upwardly from the rubber layer 17 and disposed within the associated restraining member 43 and with the vertical portion 57 projecting downwardly toward the shoe first face 11. A plurality of slits 58 is cut vertically through the rubber layer 17 and the base plate 18 of the base structure 16, these slits being disposed in parallel alinement and spaced from one another such that they receive the above-described downwardly extending vertical strip portions 57. The downwardly extending strip portions 57 of the fifth reinforcing strips 55 extend (within the slits 58) through the rubber layer 17 and within the base plate 18 and they are suitably affixed to the base plate by being welded and/or bonded thereto or by any other suitable means. The above-described fifth reinforcing strips 55 serve to anchor the respective restraining members 43 to the metal base plate 18 such that any forces tending to urge the second restraining members 43 away from the shoe first face 11 are distributed through the restraining member reinforcing strips 55 and such that the horizontal portions 56 of these strips transmit the forces throughout a relatively large area of the second restraining members.

An L-shaped, semirigid, sixth reinforcing strip 78 is embedded within the second structure 28 peripherally of its outermost portion 29, the sixth reinforcing strip, in cross section, having a vertical and a horizontal portion 79, 80. The vertical portion 79 projects downwardly within the second structure sidewall 30 and the horizontal portion 80 projects from the first portion and within the outermost portion 29. The sixth reinforcing strip serves to reinforce the peripheral edge portion of the outermost portion 29 against deformation under stresses occurring in operation of this vehicle, particularly during pivotal movement.

Referring now to FIG. 1, the first and second restraining members 42, 43 are alined such that their respective longitudinal axes extend substantially parallel to the forward direction of travel of the vehicle (not shown) on which the track shoe 10 is used. In the embodiment shown, the track shoe 10 and track pad assembly 14 have a short transverse, as represented by the line IV–IV, which extends in the direction of travel of the vehicle. The line II, III–II, III represents the long transverse of the track shoe 10 and the pad assembly 14. Thus, the first and second restraining members 42, 43 extend parallel to the line IV–IV and are parallel to the direction of travel of the vehicle. With added reference to FIG. 4, the first and second restraining members 42, 43 extend along the line IV, IV but do not extend into contact with the peripheral sidewall 30 of the second structure 28. Rather, the first and second restraining members 42, 43 are spaced, at their respective ends, centrally from the sidewall 30 of the second structure 28 such that first and second manifold passageways 59, 60 extend transversely of those restraining members 42, 43 and between their respective ends and the respective adjacent portions of the second structure sidewall 30, the manifold passageways 59, 60 providing communication to all areas within the enclosed variable-volume chamber 33 such that a fluid injected into that chamber from any point therein may freely pass to all other points therein.

With particular reference to FIG. 1, the centermost of the sidewalls 19, 30 of the first and second structures 15, 28 (*i.e.*, the sidewall 30 of the second structure 28 in the present embodiment) has, in its present rectangular configuration, two mutually spaced, elongated wall portions 61 adjacent to the portions of the grouser 13 which portions extend along the short transverse of the track shoe 10, as represented by the line IV—IV. The distal portions (those portions adjacent the distal edge 31) of these elongated sidewall portions 61 seat between and against the adjacent first lip 34 and a respectively adjacent one of the plurality of second restraining members 43, upon the second structure 28 being in its extended position, to form a composite bulkhead structure 62 which extends between the two, elongated, sidewall portions 61 and which bulkhead structure comprises the interlocked, dovetailed, widened distal portions 44, 45 of the first and second restraining members 42, 43. The bulkhead structure 62 extends generally parallel to and between the outermost portion 29 and the base structure 16. In the present embodiment in which the sidewall 19 of the first structure 15 seats against the enclosing grouser 13, this bulkhead structure 62 extends in the long transverse of the pad assembly 14 and is supportingly nestled within and against the adjacent portions of the grouser 13 such that the bulkhead structure is prevented, by the adjacent grouser, from being displaced in either direction along the line II, III—II, III.

The valve member 22 is thus in communication with all portions of the variable volume chamber 33 disposed between the first and second structures 15, 28 and the valve inlet, as represented by the valve member small end 22, is adapted to receive the air hose nozzles commonly employed to inflate automobile tires. Alternatively, the valve member 22 is configured to receive gas under pressure from fittings (not shown) mounted on a respective vehicle on which the track shoe 10 is mounted, the fittings and the modifications of the valve member 22 being of the type described in the U.S. Pat. No. 3,170,533 to K. J. Fewel, et al. In the Fewel patent, a tracked vehicle is described which has a valving mechanism suited for inflating pneumatic cells comprising an endless track, the valving mechanism being operable for automatically inflating and deflating the track cells while the vehicle is in use. The above-referenced automatic inflation system is well suited for use with the presented invention when it is desired to introduce and release fluid from the variable volume chamber 33 while the supported tracked vehicle (not shown) is in motion.

Figure 5:
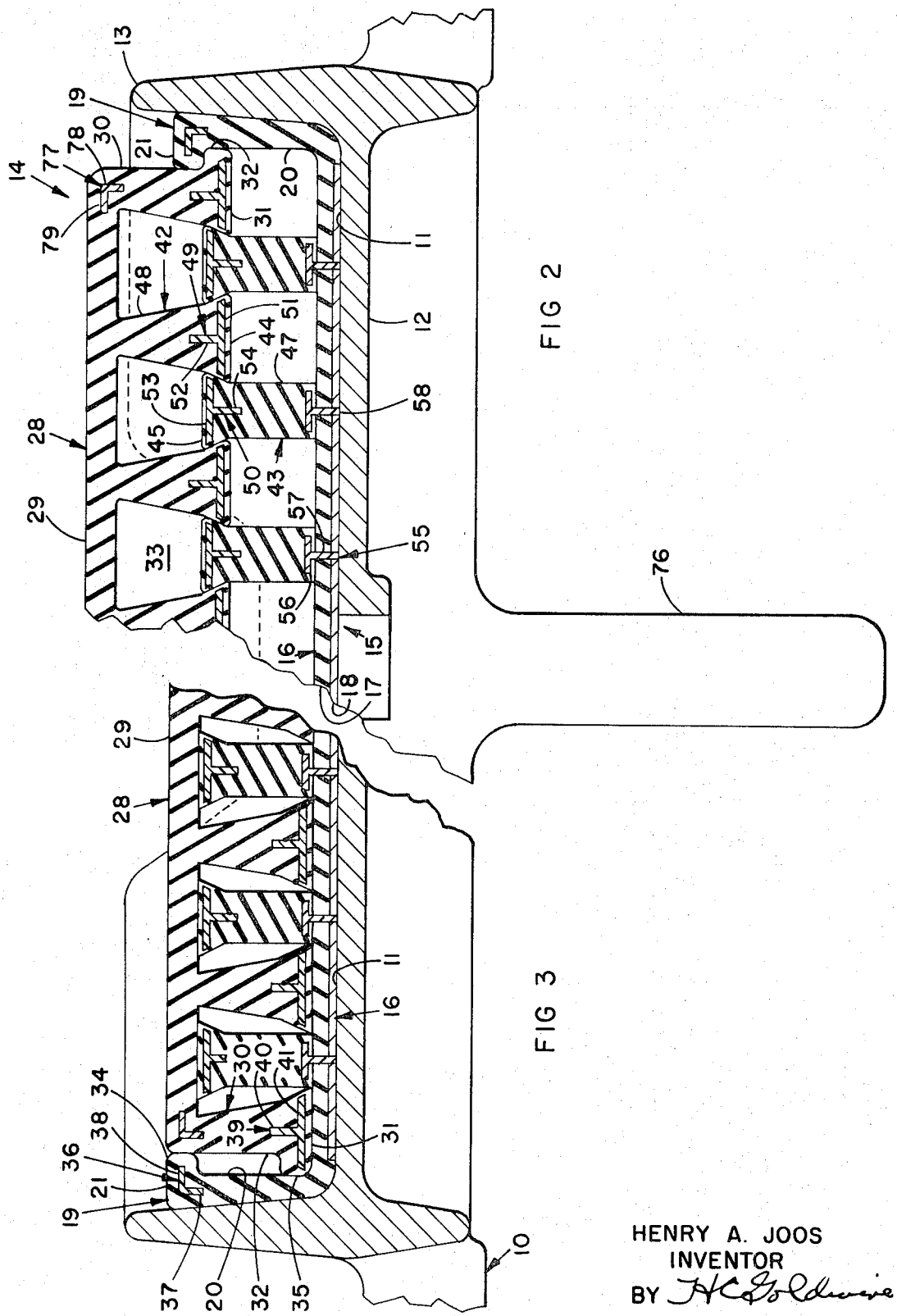
FIG. 5 is a cross-sectional view, similar to FIG. 2, of a portion of a second embodiment of the pad assembly mounted on the track shoe.
Figure 6:
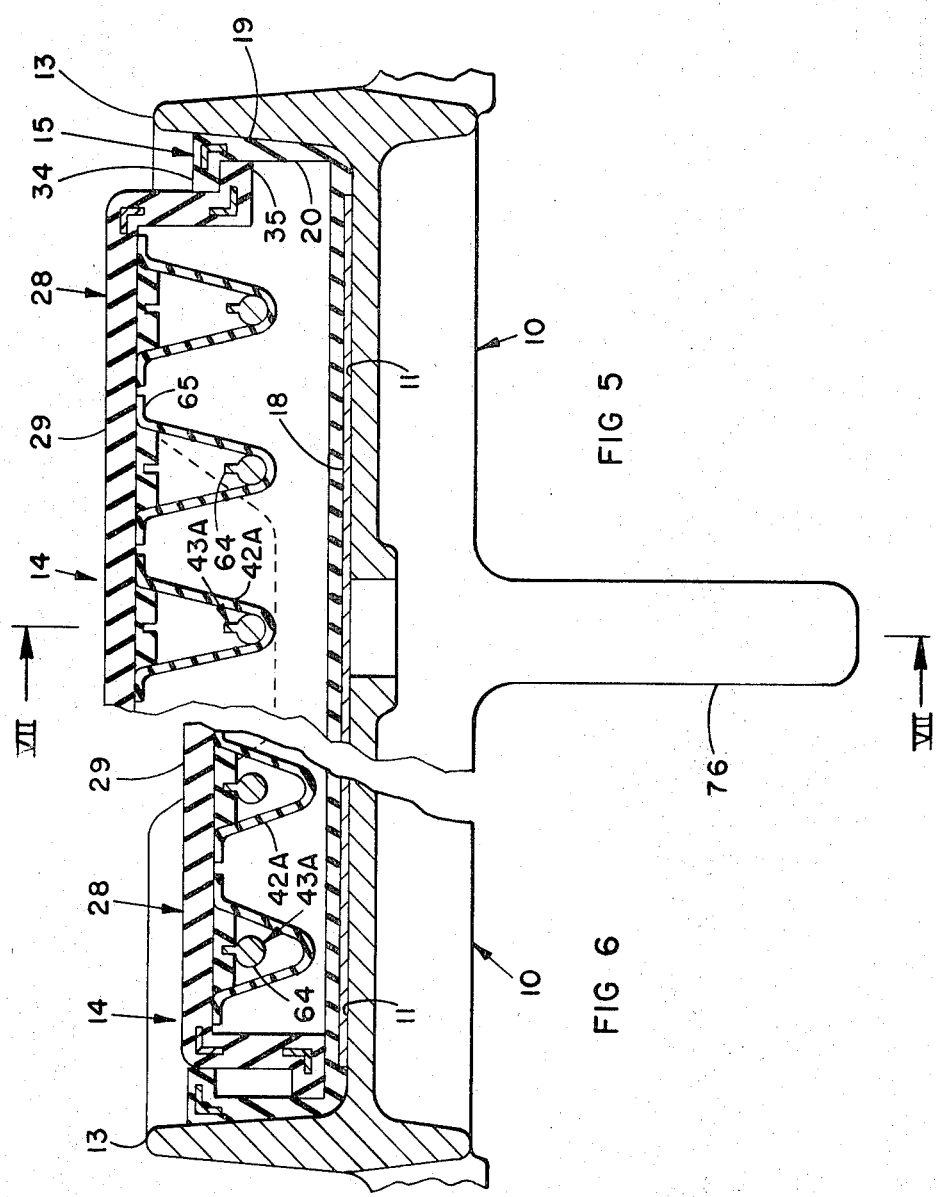
FIG. 6 is a cross-sectional view, similar to FIG. 3, of the remaining portion of the second embodiment of the pad assembly and track shoe of FIG. 5.

FIGS. 5 through 7 show a second embodiment similar to the first but with certain modifications which will now be described. Referring to FIG. 5, first and second restraining members 42A, 43A are formed such that they interlock in chain-link configuration. As shown most clearly in FIG. 7, the second restraining member 43A comprises a generally U-shaped, rigid bar which is bent at right angles at two mutually spaced portions such that it has two downwardly projecting (as viewed in the drawing) portions 63, which portions are continuous with a horizontal portion 64. The downwardly projecting portions 63 are rigidly affixed to the base plate 18 by upsetting at their ends, bolts, or any other suitable means. The first restraining members 42A comprise sheets or strips of a resilient material such as vulcanized rubber reinforced with nylon cording which sheets have, as shown most clearly in FIG. 5, opposite end portions 65 which are bondingly affixed to the outermost portion 29 of the second structure 28; the sheets are looped below respective, adjacent ones of the horizontal portions 64 of the first restraining members 43A. As shown in FIG. 6, when the second structure 28 is in its retracted position, the first restraining members 42A extend downwardly and beneath the second restraining member horizontal portions 64 and, in cross section, are approximately V-shaped. As shown in FIG. 5, upon the second structure 28 being in its extended position, the portions of the first restraining members 42A which are disposed directly beneath the horizontal portions 64 of the second restraining members 43A and thus are in vertical register with those horizontal positions 64, seat or catch against the horizontal portions such that the second structure 28 is restrained by the first and second restraining members 42A, 43A from moving further outwardly. Upon the second structure 28 being in its retracted position (FIG. 6), its outermost portion 29 seats upon the horizontal portions 64 of the second restraining members 43A.

Referring to FIGS. 8 and 9, a third embodiment is also similar to the first described above with reference to FIGS. 1 through 4, but with the following exceptions. With particular reference to FIG. 8, the first and second restraining members 42B, 43B are formed of a semirigid material such as polyethylene and are, in cross section, of a T-shaped configuration having vertical and horizontal portions 66, 67. Each of the horizontal portions 67 (equivalent to the member distal portions 44, 45 of FIGS. 2, 3) of the first and second restraining members 42B, 43B projects horizontally from the respective, associated vertical portion 66 such that it is in vertical register with the horizontal portions 67 of the respective restraining members 42B, 43B to either side and such that the horizontal portions 67 of the first and second restraining members 42B, 43B seat against each other, as shown in FIG. 8, upon the second structure 28 being in its extended position. The first restraining members 42B are suitably affixed to the outermost portion 29 of the second structure 28 by being formed integrally with a first layer 68 of semirigid material, such as polyethylene, which extends parallel to the outermost portion 29 and lies immediately below and in register with the outermost portion 29; the first layer of semirigid material 68 is bonded to the outermost portion 29 with a suitable adhesive. Similarly, the second restraining members 43B are suitably formed integrally with a second layer 69 of the same semirigid material, which layer is, in turn, bonded to the base plate 18 (and replaces the rubber layer 17, FIGS. 1—4) and extends substantially parallel to and in register with the base plate. The first semirigid layer 68 has a continuous, double, peripherally mounted wall structure 70 comprising inner and outer sidewalls 71, 72, the sidewalls projecting downwardly from the first semirigid layer 68 and toward the shoe first face 11 and each extending peripherally of the first semirigid layer 68. Similarly, the second semirigid layer 69 is provided, at its periphery, with a continuous, double wall structure 73 comprising inner and outer sidewalls 74, 75 which extend peripherally of the second semirigid layer 69 and project upwardly toward the second structure 28. The double wall structures 70, 73 of the first and second semirigid layers 68, 69 slideably interdigitate with each other, the inner sidewall 71 of the first semirigid sidewall 70 being slideably and sealingly inserted between the inner and outer sidewalls 74, 75 of the second wall structure 73 and the outer sidewall 75 of the second wall structure 73 being slideably and sealingly engaged between the inner and outer sidewalls 71, 72 of the first wall structure 70. The sidewalls 71, 72 are continuously and sealingly related to the sidewalls 74, 75 such that the variable-volume chamber 33 is pneumatically sealed thereby. Thus, the embodiment of FIGS. 8 and 9 differs from that of FIGS. 1 through 7 in that no lips 34, 35 (FIG. 3) are employed to restrain the second structure 28 from moving outwardly beyond its extended position.

The operation of each component of the pad assembly 14 will be fully described; but in initial summary, and with primary reference to FIG. 1, a fluid under pressure is introduced through the valve member 22 to the variable-volume chamber 33 when the second structure 28 is in its retracted position (FIGS. 3 and 4), and the resulting increase in fluid pressure within the chamber causes the second structure 28 to move outwardly to its extended position (FIGS. 1 and 2) for operation over paved surfaces. Air is a suitable fluid for such use, although other gases may be used; liquids may also be used, although, because they are relatively nonresilient, they do not provide the beneficial shock absorption characteristics of gases, as will be described below.

The amount of pneumatic pressure required varies according to the weight of the vehicle to be supported and according to other factors such as the terrain over which the vehicle is used; as an example, air at 3—4 p.s.i. has been found satisfactory for operation over smooth, hard-surfaced roads, and 1.5—2 p.s.i. has been used for operation over uneven surfaces. The pad assembly 14 is constructed to sustain higher pressures than these, however, because when the track shoe 10 passes beneath the vehicle and is in supporting relation thereto, the weight of the vehicle raises the pressure within the variable-volume chamber 33. Because the second structure 28 is freely slideable between its extended and retracted positions, it retracts somewhat from its most extended position upon supporting the vehicle weight; and, because of the resiliency of the air under pressure within the chamber 33, the pad assembly 14 acts as a pneumatic spring, according to principles well-known in the art, to absorb shocks and protect the vehicle from damage and excess wear, as will be more fully discussed hereinafter. Sufficient initial fluid pressure must be applied to maintain the outermost portion 29 of the second structure 28 outwardly beyond the outermost portion of the grouser 13 when the above-described vehicle load is sustained by the pad assembly 14 so that the grouser 13 does not bear against a paved surface over which the vehicle is traveling, i.e., such that the vehicle is supported by the resilient pad apparatus 14 rather than the rigid grouser 13. Thus; the pavement cannot be damaged by the grouser 11 when the pad apparatus 14 is in the pad-exposed mode.

The pad apparatus 14 is inflated and deflated through its valve member 22 in the same way that conventional automobile tires are inflated and deflated. That is, air under pressure from any suitable source is introduced into the pad apparatus 14 through an air hose connected to the source and having a nozzle adapted to engage the valve member small end 24; the valve member 22 may be opened for releasing pressure in the same manner that automobile tire valves are opened to release pressure. Such inflation and deflation takes only a few minutes, and the pad assemblies 14 need not be removed or dismounted from the track shoes 10. Alternately, and when the inflation and deflation must be accomplished with minimum delay, the automatic valve inflation mechanism described in the previously referenced Fewel patent may be employed, and inflation and deflation of the pad assemblies 14 is accomplished by air inflation apparatus mounted within the vehicle. In any case, it is only necessary, when converting from the pad-exposed mode to the grouser-exposed mode, to release the air or other fluid under pressure within the variable-volume chamber 33; i.e., it is not necessary to forceably withdraw the air within the chamber 33. This is because the weight of the vehicle itself will cause the second structure 28 to withdraw toward the shoe first face 11 to a position in which the outermost portion 29 is in line horizontally with the outermost portion of the grouser 13; and projections and variations on the ground surface over which the vehicle passes will cause the second structure 28 to withdraw further to its fully retracted position (FIG. 3) wherein the grouser 13 is exposed for effective traction in field operations. Frictional forces between the first and second structures 15, 28 then keep the second structure in its retracted position.

The advantageous construction of the first and second structures 15, 28 of vulcanized rubber, because of the resiliency of the rubber, helps the pad assembly 14 to absorb efficiently the shocks and stresses which occur in use. Further, the outermost portion 29 of the second structure 28 is necessarily of a resilient material in order to protect hard-surfaced roads from the rigid track shoe grouser 13, and it is convenient to construct the second structure 28 as an integrally formed rubber structure rather than as a composite structure having, for example, metal and rubber portions. In operation, however, the pad assembly 14 is subjected to severe stresses, particularly when the vehicle is accelerated, braked, or turned, and the various reinforcing strips serve to prevent excessive deformation or failure of the first and second structures 15, 28 under such stresses. It should be noted that the efficient use of reinforcing elements in the pad apparatus 14 is a major reason for its success while other designs have failed. In particular, it is necessary to reinforce the various interlocking members which prevent the second structure 28 from moving outwardly beyond its extended position. For example, and with particular reference to FIG. 3, because the first and second lips 34, 35 are reinforced with the first and second, semirigid reinforcing strips 36, 39, the lips are prevented from deforming as they bear against each other when the second structure 28 is urged outwardly, and the lips have sufficient strength to stop the outward movement of the second structure 28. The vertical portions 37, 40 of the respective first and second reinforcing strips 36, 39 anchor the reinforcing strips within the respective sidewalls 12, 30, and the horizontal portions 38, 41 extend toward each other for a sufficient distance to provide support for the distal portions of the lips 34, 35. Similarly, the third and fourth reinforcing strips 49, 50 of the first and second restraining members 42, 43, respectively, serve to prevent the distal portions 44, 45 of those restraining members from deforming in such manner that the second structure 28 is enabled to move outwardly beyond its extended position. The vertical portions 52, 54 of the third and fourth reinforcing strips 49, 50 serve to anchor the respective third and fourth reinforcing strips within the first and second reinforcing members 42, 43, and the horizontal portions 51, 53 extend horizontally, as described previously, such that their distal edges are in vertical register with each other such that stresses sustained by the respective restraining member widened distal portions 44, 45 are distributed throughout a wide area of those distal portions by the third and fourth reinforcing strips 49, 50. More particularly, as fluid under pressure is introduced within the variable-volume chamber 33 to urge the second structure 28 away from the plate 18 in an upward direction, the first and second restraining members 42, 43 seat and catch against each other as shown in FIG. 2, and the pneumatically induced force urges the second structure 28 and the first restraining members 42 upwardly; the first restraining member widened distal portions 44 are thus also urged upwardly and, if not reinforced by the semirigid third reinforcing strips 49, would tend to be compressed such that the widened distal portions 44 would become narrow enough to permit the first restraining members 42 to slip outwardly through and past the adjacent second restraining members 43. Because the semirigid reinforcing strips 49, 50 are embedded within the first and second restraining members 42, 43, however, the above-described, upwardly directed forces upon the first restraining members 42 are transmitted to the horizontal strip portions 51, 53 and distributed, by the third and fourth reinforcing strips 49, 50, throughout a large portion of the first and second restraining members 42, 43 such that excessive and undesirable localized deformation thereof does not occur. The vertical portions 52, 54 project, respectively, from the horizontal portions 51, 53 for a sufficient distance within the respective first and second restraining members 42, 43 to anchor the respective reinforcing strips 49, 50 within the first and second restraining members and to prevent any rotational displacement of the respective widened distal portions 44, 45 about the axes formed by the juncture of the respective horizontal and vertical strip portions 51, 52, and 53, 54. Similarly, and as previously described, the vertical forces received by the second restraining members 43 are transmitted throughout a large area of those restraining members by the fifth reinforcing strips 55 such that no excessive localized deformation of the respective second restraining members 43 occurs at their juncture with the base structure 16. The use of the reinforcing strips 36, 39, 49, 50, 55, 77 at preselected portions of the first and second structures 15, 28 protects the pad assembly 14 from undesired deformation and failure under stress, yet permits the advantageous use of a resilient material in the construction of the pad apparatus 14. Thus, the pad apparatus 14 provides the advantages of both solid and hollow track pads or tires. Because pneumatic shock-absorbing characteristics are provided by the telescopic and sliding relation between the first and second structures 15, 28, the second structure outermost portion 29 and its sidewall 30 may be made of relatively thick and durable material and of rigid construction as compared to the threads and side casings of conventional tires and/or pneumatically supported track pads; that is, the outermost layer 29 need not be of thin and undesirably flexible material such that it flexes inwardly to absorb shocks from projections or objects in the road, because sufficient shock absorption is provided by the above-described telescopic and slideable relation of the first and second structures 15, 28. Thus, the track pad assembly 14 is advantageously made of much more rugged construction than conventional pneumatic tires and pneumatic track pads; yet, its rubber construction protects hard-surfaced roads from damage and provides good traction for the vehicle. Because the track pad assembly 14 is of this thick and rugged construction, it is not susceptible to punctures and blowouts as are conventional pneumatic pads and tires. Furthermore, because the slideable relation of the first and second structures 15, 28 provides the shock-absorbing characteristics of a pneumatic spring, the need for (and the expense of) further shock-absorbing apparatus on the vehicle is minimized.

The above-described ability to yield under sudden loads is enhanced by the relative configurations of the side surfaces 47, 48 of the second and first restraining members 43, 42. It will be recalled that the side surfaces 47 of the second restraining members 43 are flat and vertical with respect to the shoe first face 11, while the side surfaces 48 of the first restraining members 42 diverge inwardly in the upward direction. Thus, the side surfaces 48 of the first restraining members 42 are not in contact with the widened distal portions 45 of the second restraining members 43 upon the second structure 28 being displaced downwardly from its extended position. Only the outermost edges of the widened distal portions 44 of the first restraining members 42 are in sliding contact with the second restraining members 43 upon the second structure 28 being thus displaced downwardly, and the frictional resistance to sliding motion of the second structure 28 is substantially reduced by the avoidance of sliding contact between the widened distal portions 45 and the first restraining members 42.

With reference to FIG. 1, the alinement of the first and second restraining members 42, 43 in such manner that their respective longitudinal axes are disposed parallel to the direction of travel of the vehicle, as represented by the line IV–IV, results in their receiving the most severe stresses, i.e., those incurred during acceleration or braking of the vehicle, along their respective longitudinal axes. Thus, the second structure 28 is braced against deformation in the direction represented by the line IV–IV by the first reinforcing members 42, and the first restraining members 42 are prevented from sliding in that direction by their being firmly locked, along their entire respective lengths, against the second restraining members 43. Further support is provided by the previously described, composite bulkhead structure 62. Any displacement of the restraining member widened distal portions 44, 45 along the line II, III–II, III is resisted by all of the widened distal portions 44, 45 of each first and second restraining member 42, 43, since each widened distal portion is maintained in locked relation to all the other ones. In the present embodiment, wherein the grouser 13 of the track shoe 10 encircles this bulkhead structure 62, further lateral support is provided by the grouser 13 since, as previously described, the bulkhead structure 62 extends between and against the grouser. The metal base plate 18 also provides structural strength to the pad assembly 14 in that each second restraining member 43 is anchored to the base plate 18 and prevented by the base plate from being displaced outwardly from the shoe first face 11. The provision of a base plate 11 also minimizes the modifications required to be made to the track shoe 10 for the mounting thereon of the pad assembly 14; that is, if such a base plate 18 were not provided, it would be necessary to anchor the various second restraining members 43 directly to the track shoe 10, thus necessitating the installation of some type of fastening means to or through the track shoe 10. Note that, in the present embodiment, the only alteration of the track shoe 10 is the single bore 27. The pad apparatus 14 may be easily adapted for mounting on various other types of existing track shoes 10 by forming the first structure 15 into a configuration adapted for seating against the respective track shoe 10; the pad apparatus 14 may also be adapted for convenient mounting on other types of ground engaging members, such as circular wheels. In any case, the first structure 15 is formed such that it seats against any grouser 13 or cleat on the respective ground engaging member so that the grouser or cleat provides support to the pad assembly 14.

With reference to the second embodiment (FIGS. 5 through 7), the pad apparatus 14 is similarly inflated and deflated for conversion of the pad apparatus 14 between a pad-exposed mode (FIGS. 5 and 7) and a grouser-exposed mode (FIG. 6). Referring to FIG. 5, the V-shaped first restraining members 42A seat and catch against the rigid, second restraining members 43A upon the second structure 28 being in its extended position, thus preventing further outward motion of the second structure. The second structure 28 is also prevented from moving outwardly beyond its extended position by the first and second lips 34, 35, as described above with respect to FIGS. 2 and 3.

With respect to the third embodiment (FIGS. 8 and 9), the T-shaped, first and second restraining members 42B, 43B catch against each other to prevent excessive outward displacement of the second structure 28 and function similarly to the first and second restraining members 42, 43 (FIG. 1) of the first embodiment. The telescopic, slideable engagement of the first and second wall structures 70, 73 helps to maintain the second structure 28 in register with the first structure 15 and to prevent horizontal displacement of the second structure 28 relative to the track shoe 10 and the first structure 15.

The variable-volume chamber 33 is pneumatically sealed by the sealing association of the first and second wall structures 70, 73 which, as previously described, extend continuously and peripherally around the second and first structures 28, 15.

While the pad apparatus 14 has been chiefly described as mounted on a track shoe 10 of a tracked vehicle, its use is not limited to such an application, and it may be advantageously employed on wheeled vehicles such as farm tractors having circular rear wheels which employ radially projecting grousers for improved traction. In such an application, the pad assembly 14 is deflated when operation in the field is required and inflated to its pad-exposed mode when operation over paved surfaces is required. Further, the pad apparatus 14 may be used advantageously on vehicles which are designed for operation only on paved surfaces, i.e., on conventional automobiles and trucks. In such an application, the pad apparatus 14 again provides the beneficial shock-absorbing characteristics of both pneumatic springing devices and of pneumatic tires while avoiding, by its rugged construction and internal reinforcement, the undesirable susceptability of conventional tires to deformation under extreme stress and to punctures and blowouts.

While only one embodiment of the invention, together with modifications thereof, has been described in detail herein and shown in the accompanying drawing, it will be evident that various further modifications are possible in the arrangement of its components without departing from the scope of the invention.

3,542,439

I claim:
1. In combination with a member for use in supporting relation to a vehicle and of a type having opposed, first and second faces and, for improving traction, a grouser rigidly mounted on the member first face and projecting outwardly therefrom into contact with the ground when the member is supportingly disposed between the vehicle and the ground, an apparatus comprising:
 a concave, first structure rigidly mounted on the member first face and having a sidewall located adjacent at least a part of the grouser and provided with a distal edge spaced outwardly from the member first face and a continuous surface generally perpendicular to the member first face and extending between the latter and the distal edge, the continuous surface forming a closed figure;
 a concave, second structure cooperating with the first structure to form a closed, variable-volume chamber and having a sidewall with a distal edge confronting the member first face and provided with a continuous surface defining a closed figure and sealingly and slidably associated along its entire length with the first structure sidewall continuous surface, at least the portion of the second structure most remote from the member first face being of a resilient material, the second structure being moveable between an extended position in which it projects outwardly, relative to the member first face, to a location beyond the grouser and a retracted position in which the second structure is displaced inwardly, relative to the member first face, from its extended position;
 means selectively operable for introducing a fluid under pressure into the closed chamber to place and maintain the second structure in its extended position and for releasing fluid from the chamber to render the second structure moveable from its extended to its retracted position; and
 means for restraining the second structure from moving outwardly beyond its extended position.

2. The apparatus of claim 1, wherein the means for restraining the second structure comprises at least one first restraining member connected with and projecting inwardly from the second structure and toward the member first face and having a distal portion and at least one second restraining member projecting outwardly from the first structure and having one end which is fixed in relation to the first structure and a distal portion disposed between the outermost portion of the second structure and the distal portion of the at least one first restraining member, the distal portion of the at least one first restraining member having at least one region in register with a corresponding region of the distal portion of the at least one second restraining member and seating against said corresponding region upon the second structure being in its extended position.

3. The apparatus of claim 1, wherein the means for restraining the second structure comprises a first lip formed on the continuous surface of the first structure sidewall and projecting toward the second structure sidewall and further comprises a second lip formed on the continuous surface of the second structure sidewall and projecting toward the first structure sidewall, the second lip seating against the first lip upon the second structure being in its extended position.

4. The apparatus of claim 3, wherein at least one of the lips is of a resilient material and has embedded therein at least a portion of a reinforcing strip of a material more rigid than the lip material.

5. The apparatus of claim 4, wherein the reinforcing strip, in cross section, comprises first and second, substantially perpendicular portions, the first strip portion projecting within the respective sidewall from which the at least one resilient lip projects and the second strip portion projecting from the first strip portion and within the at least one resilient lip.

6. The apparatus of claim 1, wherein the means for restraining the second structure comprises a plurality of elongated, mutually spaced, first restraining members having longitudinal axes disposed in parallel alinement and each connected to the second structure and projecting transversely of its respective longitudinal axis toward the member first face and from the second structure, at least one of the first restraining members having a widened distal portion, and a plurality of elongated second restraining members slideably interdigitated with the first restraining members and each having a proximal portion in immoveable relation with the first structure and each projecting transversely of its respective longitudinal axis and outwardly from the first structure and the member first face, at least one of the second restraining members having a widened distal portion adjacent the at least one first restraining member and disposed between the outermost portion of the second structure and the widened distal portion of the at least one first restraining member and seating against said widened portion upon the second structure being in its extended position.

7. The apparatus of claim 6, wherein the longitudinal axes of the first and second restraining members are alined substantially parallel to the forward direction of travel of the vehicle.

8. The apparatus of claim 6, wherein at least one of the first and second restraining member widened distal portions is of a resilient material and has embedded therein a reinforcing strip of material more rigid than that of the associated distal portion.

9. The apparatus of claim 8, wherein the reinforcing strip extends within the respective at least one restraining member widened distal portion and substantially parallel to the longitudinal axis of the respective restraining member and wherein the reinforcing strip, in cross section, comprises a vertical portion which projects from the respective restraining member widened distal portion toward the respective structure from which the restraining member projects and at least one horizontal portion which projects substantially perpendicularly from said vertical strip portion and within the respective restraining member widened distal portion.

10. The apparatus of claim 9, wherein a plurality of adjacent ones of the first and second restraining members each has bondingly embedded therein one of the reinforcing strips, the horizontal portions of the reinforcing strips of the first restraining members being spaced between the member and the horizontal portions of the strips of the second restraining members, each horizontal strip portion, in cross section, having a distal region substantially in vertical register with a corresponding region of said adjacent strip portion.

11. The apparatus of claim 10, each of the vertical portions of the reinforcing strips projecting from the respective horizontal strip portion to a point between the connected structure from which the associated restraining member projects and the horizontal portions of the reinforcing strips of the adjacent restraining members.

12. The apparatus of claim 6, wherein each of a plurality of mutually adjacent ones of the second restraining members has a respective widened distal portion which, in cross section, is approximately wedge-shaped and tapers in the direction toward the second structure, and an associated plurality of the first restraining members each has a respective widened distal portion which, in cross section, is approximately wedge-shaped and tapers in the direction toward the first structure, the distal portions of said plurality of second restraining members interlocking with the distal portions of said plurality of first restraining members, upon the second structure being in its extended position, to form a composite bulkhead structure extending between and across the interlocked first and second restraining members.

13. The apparatus of claim 12, wherein each of the plurality of mutually adjacent, second restraining members has substantially flat, parallel, opposite side surfaces extending outwardly, with respect to the member first face, to the widened distal portion of the respective restraining member, and each of the corresponding plurality of first restraining members has opposite side surfaces which are outwardly diverging in the direction toward its distal portion and, at the widest portion of the respective restraining member, slideably associated with at least one adjacent, second restraining member side surface.

14. In combination with a member for use in supporting relation to a vehicle and of a type having opposed, first and second faces and, for improving traction, a grouser rigidly mounted on the member first face and extending outwardly therefrom into contact with the ground when the member is supportingly disposed between the vehicle and the ground, an apparatus comprising:

a concave, first structure rigidly mounted on the member first face and having a wall located adjacent at least a part of the grouser and provided with a distal edge spaced outwardly from the member first face and a continuous surface generally perpendicular to the member first face and extending between the latter and the distal edge, the continuous surface forming a closed figure;

a concave, second structure cooperating with the first structure to form a closed, variable-volume chamber and having a wall with a distal edge confronting the member first face and provided with a continuous surface defining a closed figure and sealingly and slideably associated along its entire length with the first structure wall continuous surface, the second structure being moveable between an extended position in which it projects outwardly, relative to the member first face, to a location beyond the grouser and a retracted position in which the second structure is displaced inwardly, relative to the member first face, from its extended position;

a plurality of elongated, mutually spaced, first restraining members connected to the second structure and having longitudinal axes disposed in parallel alinement each first restraining member projecting transversely of its respective longitudinal axis, inwardly from the second structure, and toward the member first face, the first restraining members each having respective widened distal portions, and a plurality of elongated, second restraining members connected to the first structure and slidably interdigitating with the first restraining members, each second restraining member projecting transversely of its respective longitudinal axis and outwardly from the first structure, the second restraining members having respective widened distal portions disposed between the portion of the second structure most remote from said ground-engaging member and the widened distal portions of the first restraining members and each seating against at least one adjacent first restraining member widened distal portion upon the second structure being in its extended position; and means selectively operable for introducing a fluid under pressure into the closed chamber and between the first and second restraining members to place and maintain second structure in its extended position and for releasing fluid from the chamber to render the second structure moveable from its extended to its retracted position.

15. The apparatus of claim 14, each of the restraining members having two, opposite, end portions, the end portions facing in at least one direction being spaced from the first and second structure sidewalls to form a manifold passageway between the restraining members and the structure sidewalls and lying between the first and second structures, said passageway being a part of the means for introducing a fluid under pressure into the closed chamber and between the first and second restraining members.

16. The apparatus of claim 14, wherein the widened portions of the first and second restraining members, in cross section, are approximately wedge-shaped, tapering in the direction toward the respective, associated structure, the distal portions of the first restraining members mating with and seating interlockingly against the distal portions of the second restraining members, when the second structure is in its extended position, to form a composite bulkhead extending between and across the interlocked first and second restraining members.

17. The apparatus of claim 15, wherein the centermost of the structure sidewalls has two, mutually spaced, elongated wall portions each of which extends substantially parallel to a respectively adjacent one of the restraining members, the elongated wall portions each having a widened distal portion corresponding to the widened distal portion of the respective adjacent restraining member and seating against said restraining member widened distal portion when the second structure is in its extended position to form an extension of the composite bulkhead, such that the bulkhead extends connectingly between the two wall portions.

18. The apparatus of claim 17, wherein the grouser extends peripherally of a portion of the member first face, the first structure being adapted to seat within said member face portion and with its sidewall seated within and against the grouser, the first lip projecting centrally from the first structure peripheral wall and, upon the second structure being in its extended position, being approximately in line with the composite bulkhead, whereby the bulkhead is positionally stabilized by the grouser.